Patented May 5, 1936

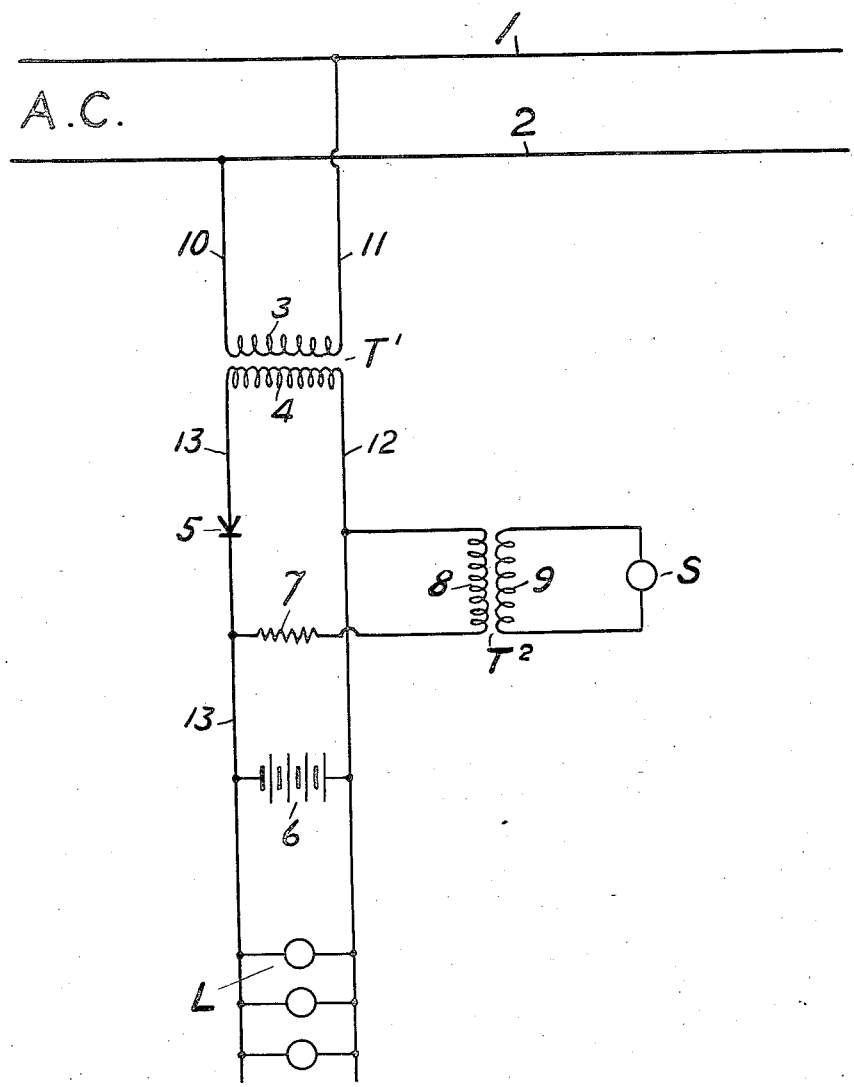

2,039,765

UNITED STATES PATENT OFFICE 2,039,765

ELECTRICAL SIGNALING DEVICE

Frank G. Beetem, Philadelphia, Pa., assignor to The Electric Storage Battery Company, Philadelphia, Pa., a corporation of New Jersey Application May 25, 1933, Serial No. 672,797

2 Claims. (Cl. 177—311)

This invention applies to an electrical system in which a storage battery is connected to a load circuit and is supplied with unidirectional pulsating current from a source of alternating current through a rectifier. The object of the invention is to provide a signaling device which will indicate when the battery is disconnected from the circuit, as for example by reason of an accidental opening of the battery circuit by the blowing of a fuse or breaking of a conductor.

In the diagram the numerals 1, 2 indicate a source of alternating current to which is connected by conductors 10 and 11 the primary winding 3 of a transformer $T^1$ whose secondary winding 4 is connected by conductors 12 and 13 to the terminals of a storage battery 6, a rectifying device 5 being inserted in the circuit between the transformer and the battery to provide a unidirectional pulsating current.

Connected across conductors 12 and 13 is shown the primary winding 8 of a transformer $T^2$ with a resistor 7 connected in series therewith. The secondary winding 9 of the transformer $T^2$ is connected to a signaling device S which may be an incandescent lamp or other signaling device responsive to alternating current.

Translating devices such as the lamps L may be connected to the battery 6.

So long as the battery is connected to the circuit 12, 13, thus maintaining a practically constant potential across this circuit, only a continuous direct current will flow through the winding 8 which may be limited to a comparatively small value by the resistor 7. This direct current will not induce any current in the secondary winding 9. If however the battery 6 should be accidentally disconnected from the circuit 12, 13 a pulsating current will be transmitted through the winding 8 which will have an alternating current component and will develop in the winding 9 and the signal device S an alternating current sufficient to cause the signal to operate and indicate the fact that the battery circuit is open.

It will be obvious to those skilled in the art to which the invention relates that modifications may be made in details of procedure without departing from the spirit of the invention which is not limited to such matters or otherwise than the prior art and the appended claims may require.

I claim:

1. In an electrical system including a storage battery connected to a source of alternating current through a rectifying apparatus, a signaling device comprising a transformer whose primary is connected across the circuit to which the battery is connected between the rectifying apparatus and the battery and whose secondary is connected to a signaling device.

2. An electric signaling system including in combination a source of alternating current, a transformer whose primary is connected across said source, a storage battery connected to the secondary of said transformer, rectifying apparatus interposed between said secondary and said storage battery, a second transformer whose primary is connected across said battery between said rectifying apparatus and said battery, and a signaling device connected to the secondary of said second transformer.

FRANK G. BEETEM.